(12) United States Patent
Pilgram et al.

(10) Patent No.: US 6,383,389 B1
(45) Date of Patent: May 7, 2002

(54) WASTEWATER TREATMENT SYSTEM AND METHOD OF CONTROL

(75) Inventors: Susan Pilgram, Lee's Summit, MO (US); Kenneth L. Norcross, III, Stillwell; Reza Shamskhorzani, Overland Park, both of KS (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/784,978

(22) Filed: Feb. 15, 2001

(51) Int. Cl.⁷ .................................................. C02F 3/20
(52) U.S. Cl. .................. 210/614; 210/620; 210/629; 210/98; 210/110; 210/141; 210/143
(58) Field of Search ............................... 210/614, 620, 210/626, 629, 739, 98, 104, 109, 110, 141, 143, 209, 220

(56) References Cited

U.S. PATENT DOCUMENTS

| | | |
|---|---|---|
| 3,470,092 A | 9/1969 | Bernard |
| 4,645,592 A | 2/1987 | Calltharp et al. |
| 4,648,967 A | 3/1987 | Calltharp et al. |
| 4,663,044 A | 5/1987 | Goronszy |
| 4,711,716 A | 12/1987 | Calltharp et al. |
| 4,724,073 A | 2/1988 | Calltharp et al. |
| 4,775,467 A | 10/1988 | Calltharp et al. |
| 4,793,930 A * | 12/1988 | Soeder et al. ............... 210/614 |
| 4,952,316 A * | 8/1990 | Cooley ....................... 210/626 |
| 4,966,705 A | 10/1990 | Jamieson et al. |
| 5,013,441 A | 5/1991 | Goronszy |
| 5,021,161 A | 6/1991 | Calltharp |
| 5,205,936 A | 4/1993 | Topnik |
| 5,354,471 A * | 10/1994 | Timpany et al. ............ 210/629 |
| 5,395,527 A * | 3/1995 | Desjardins .................. 210/629 |
| 5,525,231 A | 6/1996 | Ho et al. |
| 5,639,371 A | 6/1997 | Loy et al. |
| 5,647,986 A * | 7/1997 | Nawathe et al. ............ 210/614 |
| 5,902,484 A | 5/1999 | Timpany |
| 5,989,428 A | 11/1999 | Goronszy |
| 6,004,463 A * | 12/1999 | Swett ........................ 210/143 |

\* cited by examiner

*Primary Examiner*—Christopher Upton
(74) *Attorney, Agent, or Firm*—Wolf, Greenfield & Sacks, P.C.

(57) ABSTRACT

A wastewater treatment system for treating a wastewater stream from industrial and municipal sources uses a control system to sequence and supervise the treatment steps in a batch flow mode of operation or a continuous flow mode of operation. In operation, the wastewater treatment system predominantly operates in the batch flow mode. However, the wastewater treatment system operates in a continuous flow mode when the influent wastewater stream exceeds the system's nominal design flow transition point. The control system receives an input signal, relating to the influent flow rate, and switches one or more reactors of the wastewater treatment system from the batch flow mode to a continuous flow mode according to a control algorithm.

65 Claims, 3 Drawing Sheets

WASTEWATER TREATMENT SYSTEM AND METHOD OF CONTROL

BACKGROUND OF THE INVENTION

1. Field of the Invention

The invention relates to wastewater treatment systems and methods of their operation and, more particularly, to systems and methods of control of wastewater treatment.

2. Description of the Related Art

Typically, wastewater streams, from municipal and industrial sources, contain waste matter such as solids and soluble and insoluble organic and inorganic materials. These wastewater streams require decontamination to meet regulatory requirements before they enter the environment. Decontamination in wastewater treatment systems typically involves pretreatment, primary treatment and secondary treatment. Pretreatment may involve equalization, neutralization and insoluble organic removal. Primary treatment may involve screening or sedimentation systems and other methods to remove fine, medium and large sized particles.

In some wastewater treatment systems, secondary treatment involves biological digestion or biological treatment. Specifically, biological wastewater treatment systems typically employ biomass with bacteria to digest biodegradable material in conventional sequencing batch flow, treatment systems. These systems, frequently, aerate wastewater in the presence of the bacteria and subsequently clarify the liquid before discharge to the environment.

For example, Goronszy, in U.S. Pat. No. 5,989,428, discloses a method and apparatus for treating waste material using a reactor or a series of reactors. The influent is treated by controlling the metabolic activity of the microorganisms by monitoring the oxygen utilization rate or the potential oxygen utilization rate of the biomass so as to determine the required amount of oxygen to be supplied to the biomass.

In another patent, Goronszy, in U.S. Pat. No. 5,013,441, discloses a biological nutrient removal system with sludge-bulking control in a batch-activated sludge system. The activated sludge sewage treatment process is received into a sewage treating basin in a first zone into which activated sludge is mixed and retained for a period sufficient to form a non-bulking sludge and absorb biodegradable dissolved compounds. It is aerated and subjected to a quiescent condition to permit settling of the sludge in a zone that has less than approximately 20% of the biochemical oxygen demand of the original sewage.

In most cases, these systems treat a normal flow of incoming wastewater. However, variations in flow conditions and contaminant concentration in the incoming wastewater streams, typically known as the influent or influent stream, periodically occur. Under normal conditions, wastewater flow varies because of ordinary fluctuations in household water use and discharge. However, rainstorms draining into a wastewater collection system, in many instances, produce higher than normal wastewater flow. Although these high flow situations occur infrequently, about 10 to 25% of the time on a yearly basis, wastewater treatment facilities must be flexible and accommodate such overflows.

Efforts to develop wastewater treatment systems that respond to high flow rates have been disclosed. For example, Loy et al., in U.S. Pat. No. 5,639,371, disclose an aeration reactor having two or more cells connected in series with a clarifier. When the flow rate of the incoming wastewater exceeds a selected level, incoming wastewater flows into the second cell until the surge has subsided.

Also, Timpany, in U.S. Pat. No. 5,902,484, describes a system for biologically treating wastewater by a modified activated sludge process in at least two treatment cells hydraulically connected in series. The first cell is a feed cell for incoming untreated wastewater and the last cell is the discharge cell for settling of suspended solids. The last cell has a means to transfer mixed liquor suspended solids and partially treated wastewater back to a prior treatment cell. Timpany discloses a method involving feeding wastewater through a plurality of treatment cells hydraulically connected in series, aerating in at least one cell, settling of suspended solids from at least one treatment discharge cell, and transferring mixed liquor suspended solids back to at least one previous cell.

Calltharp, in U.S. Pat. No. 5,021,161, discloses a process strategy for the treatment of a sequencing batch reactor wherein wastewater, in quantities above a pre-selected minimum amount, is proportionally aerated. Topnik, in U.S. Pat. No. 5,205,936, discloses sequencing batch reactors with volumetrically controlled withdrawals. A storm control procedure shortens the cycle times according to the magnitude of the rate. These systems differ from conventional sequencing batch flow, treatment systems and consequently require substantial capital costs compared to conventional sequencing batch flow, treatment systems.

SUMMARY OF THE INVENTION

In accordance with one embodiment, the invention relates to a wastewater treatment system having a flow control comprising an influent system with an influent flow. The wastewater treatment system also includes a wastewater treatment apparatus fluidly connected to the influent system and has a pump and a valve. The wastewater treatment system also comprises a regulating apparatus controlling one of the pump and the valve and comprises a controller and an input apparatus for providing an input signal which represents an influent flow. The controller analyzes the input signal and generates an output signal configured for one of a batch flow mode and a continuous flow mode.

The invention also provides a control system for regulating a wastewater treatment system. The control system comprises an input apparatus connected to the wastewater treatment system for transmitting an input signal corresponding to an influent flow. The control system further comprises a microprocessor for receiving and analyzing the input signal according to a logic program code and generating an output signal corresponding to one of a batch flow mode and a continuous flow mode. The control system also has an output apparatus for receiving the output signal and actuating a valve to regulate a flow in the wastewater system in one of the batch and the continuous flow modes.

In another embodiment, the invention provides a method for treating a wastewater stream comprising introducing the wastewater stream into a wastewater treatment system and measuring a rate of wastewater stream flow. The method also comprises controlling the wastewater treatment system in one of a batch flow mode and a continuous flow mode according to the measured rate.

In yet another embodiment, the invention provides a method for controlling a wastewater treatment system comprising introducing a wastewater stream into the wastewater treatment system and transmitting a process signal corresponding to an operating condition in the wastewater treatment system. The method further comprises analyzing the process signal and providing an output signal corresponding to one of a batch flow mode of operation and a continuous flow mode of operation according to a set of predetermined conditions. The method also actuates a valve based on the output signal.

Also disclosed is a method for controlling a wastewater treatment system comprising transmitting a process signal from the wastewater treatment system corresponding to one of a first influent flow rate and a second influent flow rate. The method also comprises sequencing the periods of treatment of the wastewater treatment system in a batch flow mode during the first influent flow rate and sequencing the periods of treatment of the wastewater treatment system in a continuous flow mode during the second influent flow rate. In this embodiment, the second influent flow rate is greater than the first influent flow rate.

BRIEF DESCRIPTION OF THE DRAWINGS

Preferred, non-limiting embodiments of the present invention will be described by way of example with reference to the accompanying drawings, in which.

DETAILED DESCRIPTION

Figure 1:
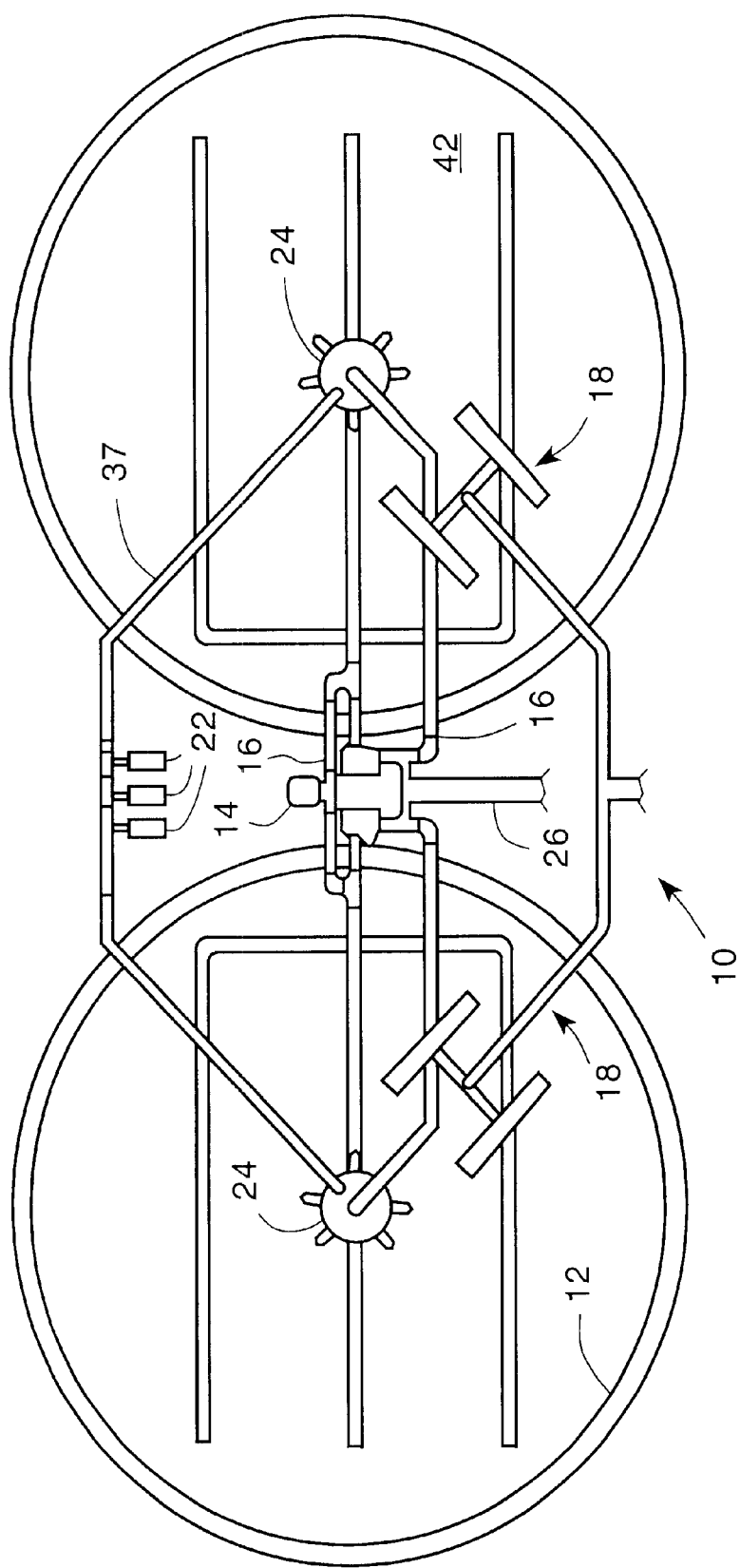
FIG. 1 is a top plan view of a wastewater treatment system of the invention.

The invention is directed to a wastewater treatment system and, more particularly, to a system for controlling a wastewater treatment system and method of operation. The invention includes a wastewater treatment system, typically an aerobic biological treatment system using biomass to digest or degrade biodegradable materials in the influent stream. Further, the wastewater treatment system includes at least one control system controlling at least one reactor with associated piping and pumping components.

In operation, the treatment system typically decontaminates the influent in a treatment cycle composed of a series of steps or periods. These treatment steps may vary according a number of factors including, for example, influent flow rate, pollutant concentration and type, biomass concentration and diversity or type, ambient temperature, air flow, number available reactors and other conditions such as downstream capacity and availability.

The various embodiments and aspects of the invention will be better understood from the following definitions. As used herein, "influent" defines a stream of "wastewater," from a municipal or industrial source, having pollutants or "biodegradable material," inorganic or organic compounds capable of being decomposed by bacteria, flowing into the wastewater treatment system. A "wastewater treatment apparatus" is a system, typically a biological treatment system, having a "biomass," a population of bacterial microorganisms or a diversity of types of bacteria, used to digest biodegradable material. Notably, the biomass requires an environment that provides the proper conditions for growth including nutrients.

"Digestion" refers to the biodegradation process where the biomass consumes the biodegradable material and reduces the biodegradable material to solid material which can be flocculated and removed by gravity sedimentation or settling into sludge. For example, in the biodegradation process, bacteria may use enzymes to hydrolyze or breakdown complex organic compounds, such as carbohydrates, into simple organic molecules, like carbon dioxide and water. During digestion, the bacteria may also reproduce which results in additional biomass. The settling process may also produce a substantially clear liquid layer above the settled sludge layer. Notably, the sludge may contain digested inorganic and organic materials and biomass.

Moreover, digestion may be under aerobic conditions wherein the biomass and the wastewater liquid mixes with oxygen. Alternatively, digestion may be under "anoxic" or anaerobic conditions, where no oxygen or air is added to the reactor. The latter is used to facilitate biodegradation of nitrogen containing compounds, such as nitrates.

In service, the wastewater treatment system predominantly operates and decontaminates as a batch flow, treatment system, typically with at least one batch reactor (BRT) or sequencing batch reactor (SBR). During high flow rates, the wastewater treatment system operates and decontaminates as a continuous influent flow, treatment system, typically as a continuous flow batch reactor (CFBRT). In one embodiment of the invention, the controller regulates the wastewater treatment system, monitors the incoming wastewater flow and determines the mode of operation. In another embodiment, the controller determines whether to switch operation of the wastewater treatment system from a batch flow mode and back to a continuous flow mode. In yet another embodiment, the invention relates to modifying or retrofitting an existing conventional batch flow, treatment system with minimal significant capital expenditure, to provide a cost-effective upgrade solution for situations where such existing systems have insufficient treatment capacity.

The batch flow mode of operation, discussed further below, typically includes at least one of a filling step, an aerating step, a settling step, a decanting step and an idle step. The continuous flow mode of operation, also discussed below, includes filling while at least aerating, mixing, settling and decanting. When the wastewater treatment system operates or treats wastewater in the batch flow mode, the reactor in the wastewater treatment system performs treatment steps or periods on a batch quantity of influent contained in the reactor before discharge. In contrast, when the wastewater treatment system operates in the continuous flow mode, a continuous flow of influent enters the reactor while the reactor cycles through the treatment steps.

In one embodiment of the invention, a wastewater treatment system 10 is shown in FIG. 1 with a reactor 12 and a pumping system with pump 14 connected to a piping manifold 16. FIG. 1 also shows a treatment system with a decanting system 18, an aeration system with a conduit 20, an air source 22, a distribution structure 24 and a sludge conduit 26. Wastewater, for example, from a municipal or industrial source, indicated by reference 28, flows into the reactor through a filling system through the piping manifold 16 and a distribution conduit 30 located near the bottom of reactor 12. In the sectional view of FIG. 2, piping manifold 16 includes at least one influent valve 32, for throttling and regulating the influent flow, conduits 34 and 36, fluidly connected to valve 32 and to distribution conduit 30. The filling system may include at least one baffle wall to dissipate any inlet turbulence.

Figure 3:
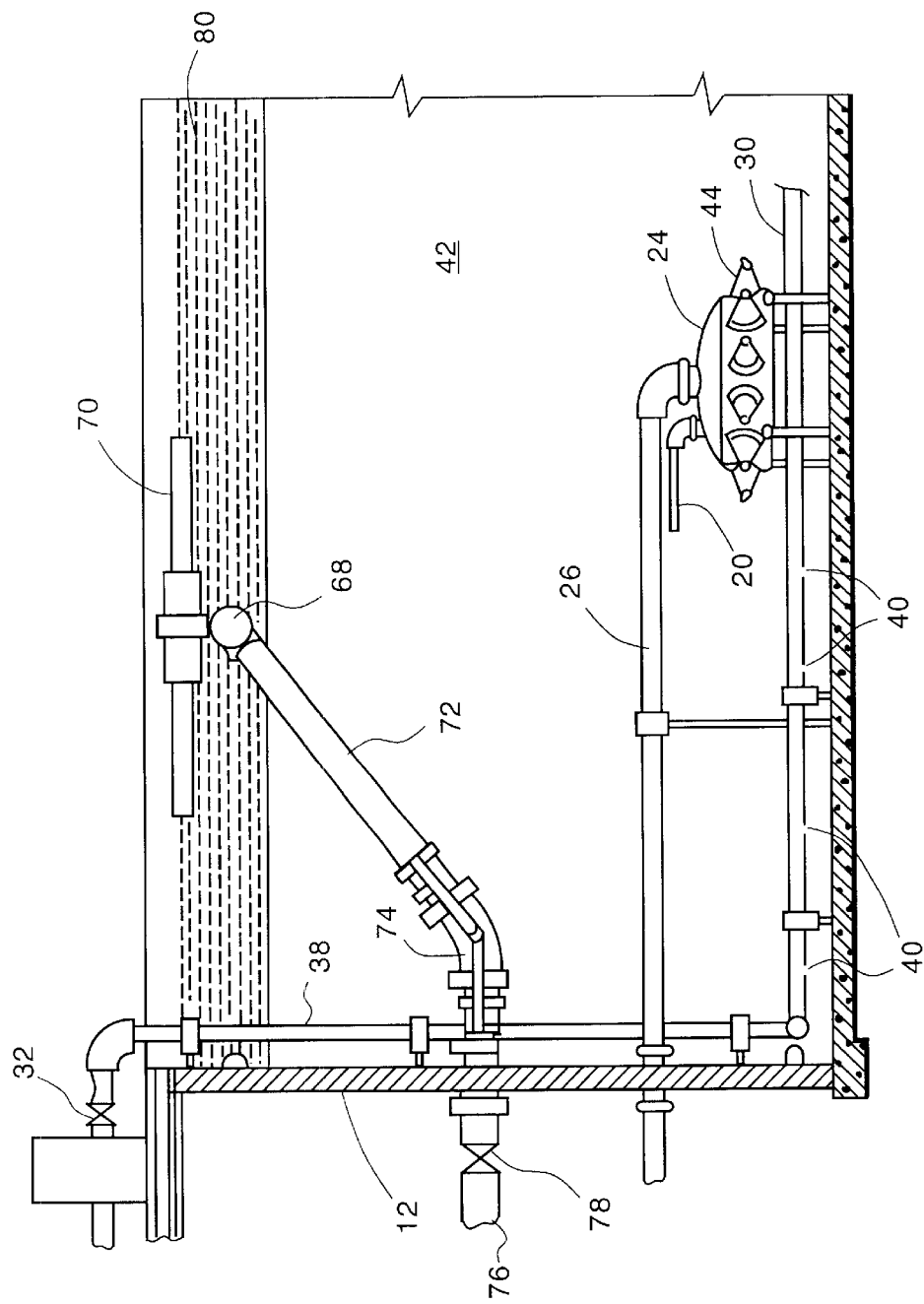
FIG. 3 is a cross-sectional side view taken along section line 3—3 of FIG. 1.

As shown in the cross-sectional view of FIG. 3, distribution conduit 30 connects to wastewater source 28 through a downcomer or riser 38. Each distribution conduit 30 may have a plurality of apertures 40 spaced along its length through which influent enters reactor 12 and joins with the liquid 42.

In another embodiment, the influent system may include at least one baffle wall. Also, the influent system may include a distribution system having at least one baffle wall that allows influent to enter reactor 12 without substantially disturbing liquid 42 or at least preventing any significant turbulence in liquid 42 that destroys anoxic conditions.

The wastewater treatment system of the invention also may have an aeration system supplying air or oxygen to liquid 42. As shown, the aeration system may have at least one distribution structure 24 connected to at least one air source 22 by conduit 20. Further, distribution structure 24 typically has a number of nozzles 44 positioned around its perimeter through which air passes and contacts liquid 42.

The aeration system may be used as a mixing system by introducing air or liquid at a rate sufficient to create turbulence and effect mixing of liquid 42. Thus, in one embodiment air enters reactor 12 from air source 22 through nozzles 44 of distribution structure 24 at a rate that promotes mixing of liquid 42. In another embodiment, mixing of liquid 42 may be effected by withdrawing at least a portion of liquid 42 through, for example, apertures 40 along conduit 30, and introducing that withdrawn portion of liquid 42 through nozzles 44 of distribution structure 24 at a rate sufficient to create turbulence and effect mixing of liquid 42.

The pumping system typically includes at least one pump 14 fluidly connected to manifold 16 to circulate, transfer or move fluid. Particularly illustrated in the embodiment of FIG. 2, pump 14 connects to conduits 26, 34 and 46 of manifold 16 through valves 48, 50, 52, 54 and 56. Additional connections in manifold 16 may include conduit 60 connecting conduit 46, downstream of valve 50, to conduit 34, between pump 14 and valve 48; and conduit 62 connecting conduit 34, between valve 48 and conduit 36, to conduit 26 before valve 56. Other similar connections in manifold 16 may be included to provide flexible operation and control of the wastewater treatment system. For example, additional connections may be provided to other reactors so that fluids may be transferred from one reactor to another.

In another embodiment of the invention, the wastewater treatment system further includes a sludge removal or withdrawal system for withdrawing or removing sludge or solids collected near the bottom of the reactor to a sludge treatment facility 64. For example, referring to the embodiment illustrated in FIG. 2, conduit 34 connects distribution conduit 30 to the inlet or suction side of pump 14 through valve 48. And, conduits 26 and 46 connect the pump discharge to the sludge treatment system 64 through valve 56. In this manner, the pumping system may be operated, in conjunction with proper valve alignment, to remove sludge from reactor 12.

In yet another embodiment, the wastewater treatment system may include at least one decanting system 18 for withdrawing a substantially clear layer near the top of the liquid 42 and discharging to effluent disposal 66. The embodiment of decanting system 18 typically illustrated in FIGS. 1, 2 and 3 includes at least one receiver apparatus 68 with at least one flotation apparatus 70. Flotation apparatus 70 provides sufficient buoyancy to the decanting system so that receiver apparatus 68 remains near the top surface of the liquid 42. Typically, receiver apparatus 68 withdraws a substantially clear layer of liquid 80. In the receiver apparatus, the liquid, as effluent, flows through conduits 72, 74 and 76 and discharges to effluent disposal 66 through effluent valve 78. In operation, the decanting system may transfer the top layer of liquid 42 without pumping assistance.

Alternatively, the decanting system may connect to piping manifold 16 and to the pumping system. In this arrangement, the suction side of pump 14 connects to the decanting system through at least one of conduits 72, 74 and 76. The discharge side of pump 14 then connects to the effluent disposal 66 through conduit 46 and effluent valve 78. Thus, the pumping system may be operated to assist the decanting system in transferring or removing the top layer of liquid 42.

A control system for supervising the treatment facility is essential to optimal operation. The control system typically determines, analyzes and controls the process conditions of each reactor in the wastewater treatment system as well directs and provides output signals effecting such control. In one embodiment of the invention, the control system calculates the influent flow rate, compares that calculated flow rate to a set-point, such as a flow transition set-point, or to other similar requirement and then directs operation of the wastewater treatment system according a batch or a continuous flow mode. Further, the control system may be configured to be sufficiently flexible and adaptive to ignore transient or intermittent operating conditions in the treatment system. For example, the control system may be sufficiently adaptive to ignore transient spikes in influent flow measurements which do not immediately require a change in operating mode.

The control system may include at least one controller 82, typically automated, providing at least one output signal to at least one output apparatus or device. For example, the output apparatus includes at least one of the valves 32, 48, 50, 52, 54, 56 and 78. Controller 82 also may provide an output signal to pump 14 and air source 38. In another embodiment, the control system further includes at least one of a radio or other type of wireless interface, a peer input and output serial and/or parallel port (I/O port), an internal real time clock and a process display capable of portraying and/or printing or recording the operational status of the wastewater treatment system. These peripheral components are typically included to accommodate flexible operation of the system and may provide for subsequent modifications.

The control system typically operates automatically with one or more reactors in automatic mode and may allow for maintenance, equipment failure or operator control. In particular, the control system may be configured to detect failure of critical equipment, such as influent valves, air sources, air valves or decant systems. During such conditions, the control system typically removes the failed reactor, or the reactor associated with the failed equipment, from service and provides alarms or warnings accordingly.

Figure 2:
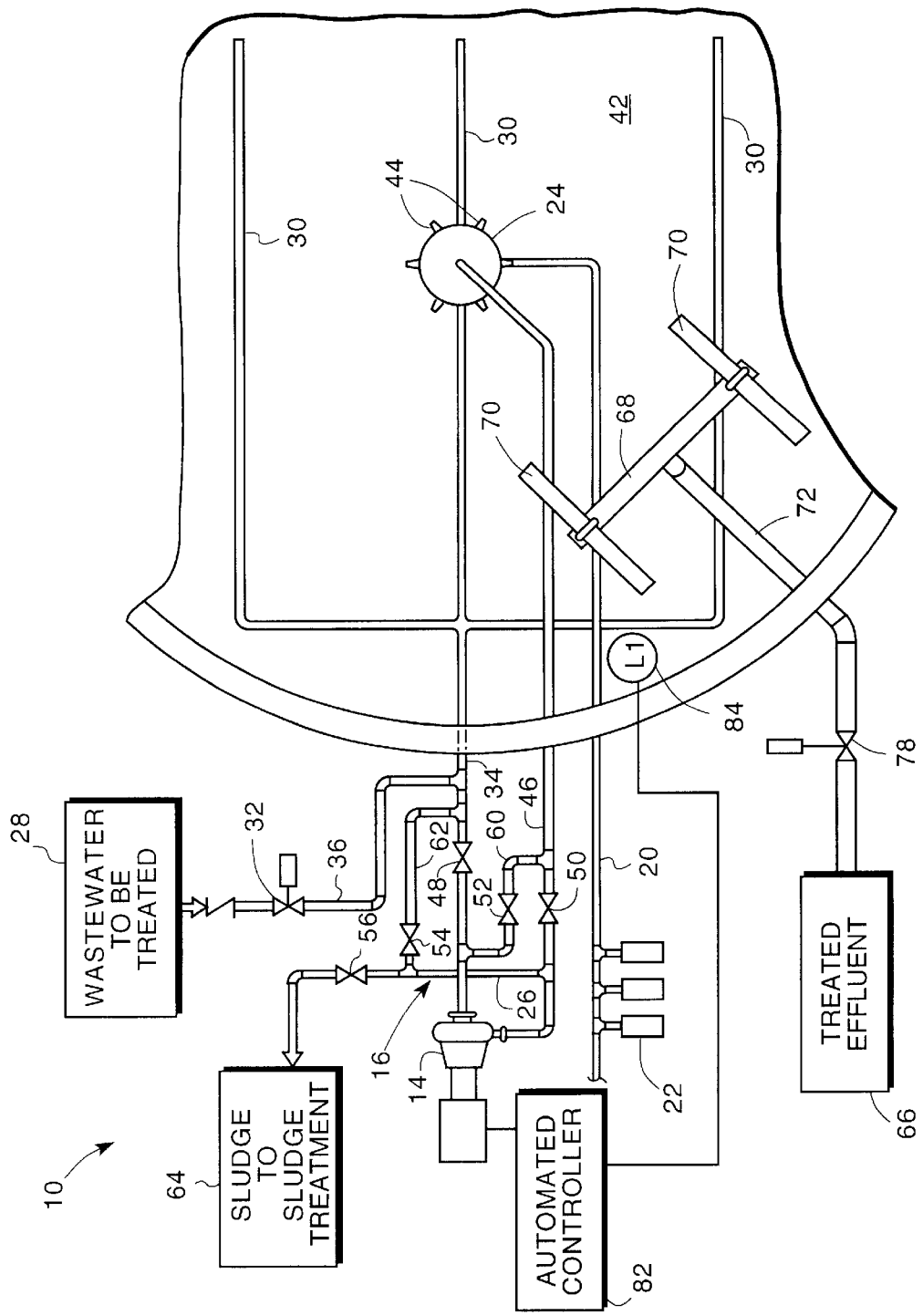
FIG. 2 is a sectional view of the wastewater treatment system of FIG. 1.

In another embodiment, the control system includes at least one input apparatus 84 connected to controller 82. For example, the embodiment illustrated in FIG. 2 depicts a fluid level sensor or indicator providing an input signal to the control system. The level indicator typically transmits a 4 to 20 milliamp (mA) analog signal corresponding to a height or level of liquid 42 in reactor 12. An analog to digital converter (A/D converter) may convert that transmitted analog signal to a digital signal and transmit the digital signal to controller 82. However, other types of input apparatus, such as a flow meter, a pressure sensor, a composition analyzer and a temperature indicator or an on/off-indication level sensor, may be connected to provide similar input signals, singly or in combination, to one the A/D converter and controller 82. For example, the input apparatus may include a flow meter in conduit 36 measuring the influent flow rate, another flow meter in conduit 76 measuring the effluent flow rate, another flow meter in conduit 20 measuring the air flow rate, and a composition analyzer, such a chromatograph, in conduit 76 measuring the composition of the effluent. In an alternative embodiment, the input apparatus may be a keypad, or other man-machine-interface such as a computer with a keyboard and a graphical interface, which provides the operator of the treatment facility the capability to monitor, operate and control individual components of the treatment system.

The output signal or signals from controller 82 may be a digital or analog signal directing at least one of valves 32, 48, 50, 52, 54, 56, 78, pump 14 and air source 38. Alternatively, controller 82 may send a digital output signal or signals to a digital to analog converter (D/A converter) to control any of the output apparatus. For example, controller 82 may generate a digital output signal which may then be converted to a 4 to 20 mA analog signal, or a 3 to 15 $lb_f/in^2$ pneumatic analog signal, by the D/A converter. This analog signal may be sent to any of the valve or valve actuator or motor control center to throttle the valve or to energize the motor of a pump or air source. Notably, the connection between controller 82 any of the input or output apparatus may be by wire or may be wireless.

Controller 82 typically comprises at least one microprocessor, such as a PC, a timer/switch system, a programmable logic controller (PLC) or a distributed control system (DCS), having computational capability, at least one memory element, at least one display element, man-machine interface, program code and set-point or requirement. The memory element typically comprises of CMOS RAM and EPROM cartridges capable of storing the program code and the set-points or requirements. The display element may be any such element typically used to depict the conditions of the treatment system such as a display panel or a computer with graphical display. The man-machine interface may be any system capable of allowing operator interaction with the control system. This interface typically includes at least a display panel, a keypad, a computer and accompanying software. Typically, the man-machine interface graphically depicts the conditions of the wastewater treatment system and permits operator interaction with the wastewater treatment system through the control system. For example, the man-machine interface may show the particular step in the treatment cycle for each reactor and the status of each valve in the treatment system as well as elapsed cycle time, elapsed step time and even set-points. The program code or program, described below, typically comprises of logic elements such ladder logic and may include the set-points that trigger changes in operation of the wastewater treatment system.

The timer/switch system is typically an arrangement wherein a timer, or a series of timers, open or close a switch or a set of switches which activate at least one valve motor.

The microprocessors may be arranged in a number of configurations depending on the complexity or need for flexibility of the wastewater treatment system. For example, the control system may include two microprocessors wherein one is the primary and the other, running concurrently, acts as a hot back-up capable of assuming the duties of the primary should the primary fail. Alternatively, the combination of microprocessors may be connected where one or more microprocessors control one or more microprocessors. In such an arrangement, for example, the control system includes a PLC and DCS combination where several PLCs connect through a DCS. In yet another arrangement, the control system may include an combination of microprocessors wherein a supervisory microprocessor receives and analyzes all input signals from one reactor and generates one or more output signals to one or more slave microprocessors each, in turn, controlling one or more reactors.

In operation, the wastewater treatment system may decontaminate influent in a batch flow mode or in a continuous flow mode. Specifically, the batch flow mode of operation treats the influent in batches so that each reactor performs treatment steps on a batch quantity of wastewater. In contrast, the continuous flow mode of operation treats a continuously flowing wastewater stream so that the reactors, singly, in series or in parallel, continuously accept influent while performing the treatment steps. Specific control of the wastewater treatment system, including specific control of the reactors in the wastewater treatment system in either the batch flow or continuous flow modes depend on several factors including, for example, liquid level, influent flow rate, contaminant concentration, ambient conditions and effluent flow rate.

Thus, in one aspect of the invention, controller 82 includes at least one flow transition set-point so that in operation and influent flow rates below the flow transition set-point, controller 82 sequences the reactors in the batch flow mode. When the influent flow rate is at about or above the flow transition set-point, controller 82 changes one or more reactors, depending on several factors including, for example, the particular treatment step at the switching instant, to continuous flow mode. Conversely, when the influent flow falls below the flow transition set-point or other conditions no longer requiring high flow capacity, controller 82 switches one or more reactors from continuous flow mode to batch flow mode.

As mentioned, the batch flow mode may include treatment steps, such as, filling, aerating, mixing, reacting, quiescent settling, decanting or idling. The sequencing and duration of these batch flow steps may be varied through the program by programmed control algorithms including, for example, fuzzy logic or artificial intelligence. The continuous flow mode may include treatment steps, such as, anoxic fill, aerated fill, filled settle and filled decant. As with the batch flow mode, the sequencing and duration of these continuous flow steps may be varied by preprogrammed control algorithms including, for example, fuzzy logic or artificial intelligence. Moreover, the control system may include a series of set-points corresponding, for example, to incremental influent conditions that trigger step-wise, or continuous, modification of each treatment step, in either the batch flow mode or continuous flow mode, so that the duration of one or more treatment step may be accordingly shortened or lengthened depending, for example, on the influent flow rate and effluent contaminant concentration.

Further, the control system may include control loops that control or supervise components or subsystem of the wastewater treatment system. Specifically, individual control loops may involve any or a combination of proportional, integral or differential controllers. These control loops may exist and operate independent of the program or may reside within the program. For example, the control system may have control loops that control each reactor or each valve, pump or even step in each of the batch or continuous flow modes. These individual loops typically require specific tuning or adjustment according to any of control loop performance, valve performance and actuator performance.

During the filling step, the input apparatus sends an analog or digital input signal corresponding to the level of liquid 42 in the filling reactor. An A/D converter changes this analog signal to a digital signal according to a predetermined conversion factor. Controller 82 receives the digital input signal through at least one I/O port and calculates a liquid level and simultaneously compares the liquid level against the set-point or set-points. If, for example, the liquid level is at or above the set-point, controller 82 may terminate the filling cycle for that filling reactor and divert influent flow to the next available reactor. Specifically, controller 82 sends an output signal, typically a digital output signal that corresponds to actuating at least valve 32. This output signal may be sent through an I/O port to a D/A converter. The D/A converter my change the digital output signal to a 4 to 20 mA current in a 12 or 24 volt analog circuit or to a 3 to 15 $lb_f/in^2$ pneumatic actuation signal. The output apparatus, valve or the actuator of valve 32 in this example, receives the analog output signal and reacts accordingly. Similar output signals may be generated by controller 82 for other output apparatus. At the end of the filling step, controller 82 may prepare the reactor for the next step.

Notably, controller 82, or the A/D converter, may sample or otherwise determine the liquid level at predetermined fixed or variable intervals. For example, the liquid level may be sampled or calculated once every millisecond or every second or only after a predetermined filling time has elapsed. In this manner, controller 82 may be optimized so to reduce its computational duties.

For example, in the filling step of the batch flow mode, and referring back to FIG. 1, influent typically flows into at least one reactor through conduit 36, downcomer 38 and through apertures 40 of distribution conduit 30. In an alternative arrangement embodying features of the invention; pump 14 withdraws influent and drives the influent to distribution conduit 30 or distribution structure 24. Referring to FIG. 2, the specific valve arrangement for such flow configuration requires valves 32, 48 and 50 to be open while all other valves to be closed. As mentioned, the wastewater treatment system may be controlled according to a predetermined or programmed instruction. In an embodiment of the present invention, controller 82 sends at least one output signal to valve or the actuator of valves 32, 48 and 50 to open or allow a desired flow through these valves. Simultaneously, controller 82 also sends output signals to valve or the actuators of valves 52, 54, 56, and 78 to close these valves and prevent fluid flow. Notably, filling may be performed with or without mixing or turbulence in the liquid. In particular, anoxic filling, is preferable because such operation promotes distribution of influent without disruption of settled solids and helps control diversity or selectivity of biomass population.

The next step in the batch flow mode may involve mixing the liquid in the filled reactor. This step need not necessarily follow the filling step and may, in some cycles, overlap with other steps or may be eliminated. For example, this step may occur with the aerating step. This step may involve withdrawing a portion of the liquid through distribution conduit 30. In one embodiment, liquid flows into the reactor through piping manifold 16 and distribution structure 24. In such configuration, for example, valves 48 and 50 are open and valves 32, 52, 54, 56 and 78 are closed. Thus, controller 82 sends output signals to allow a desired flow through valves 48 and 50 and to the motor control center to energize pump motor of pump 14. Controller 82 also sends output signals to close valves 32, 52, 54, 56 and 78.

Another step in the batch flow mode may include aeration of liquid 42 to promote biodigestion or degradation. In the aerating step, air oxygenates the liquid and the biomass to promote biological activity and digestion of biodegradable material. Typically, the air source 22 supplies air to distribution structure 24. Air leaves distribution structure 24 through nozzles 44 and contacts biomass in liquid 42. Aeration generally provides oxygen to the biomass to promote bioactivity and may promote, in some cases, mixing of the liquid and the biomass. Aeration may commence as early as the latter stage of the filling step but need not necessarily immediately follow the filling step. Aeration, in another embodiment, may continue or overlap with the sludge removal step so that liquid withdrawn from conduit 30 mixes with air from source 22. In another embodiment of the invention, controller 82 regulates aeration by activating air source 22 so that air becomes sufficiently pressurized to overcome the head pressure exerted by liquid 42 on distribution structure 24 thus forcing air to flow and bubble out through nozzles 44. An air valve (not shown) may also be controlled by controller 82 so that air flowing through conduit 20 may be regulated.

In the settling step, or quiescent settling of the batch flow mode, aeration ends and the biomass, digested materials and solids are allowed to settle. The settling step typically involves minimal or no liquid flow, entering or leaving the reactor. The settling step typically stratifies the liquid so that solids settle near the bottom, and a substantially clear layer, near the top of liquid 42, forms above the settled solids.

The decanting step withdraws the layer of substantially clear liquid 80, or liquid nearly free of solids, from the upper portion of the liquid in the reactor, through the decanting system. Substantially clear liquid flows into receiver apparatus 68, through conduits 72, 74 and 76 and discharges to effluent disposal 66 through effluent valve 78. If the pumping system also connects to the decanting system, the suction side of pump 14 receives fluid from receiver apparatus 68 and through at least one of conduits 72, 74 and 76. The discharge side of pump 14 discharges to effluent disposal 66. In an embodiment of the invention, controller 82 opens at least one of valve 78 and pump 14 and closes at least one of valves 32, 48, 50, 52, 54 and 56.

As with the decanting step, the sludge removal step of the batch flow mode typically, but not necessarily, follows settling. Notably, sludge removal may continue into the treatment step following settling or may proceed with the decanting step. In the sludge removal step, an amount of sludge, essentially settled solids, may be withdrawn from the reactor when pump 14 draws in the sludge near the bottom of the reactor through apertures 40 of conduit 30. Pump 14 discharges the sludge to sludge treatment 64 through conduit 26. In one embodiment of the invention, controller 82 generates output signals to open valves 48 and 56 and close valves 32, 50, 52 and 54.

The batch flow mode may further include an idle step wherein significantly all systems remain idle. Ordinarily, the duration of this step varies according to influent conditions so that as the influent rate increases, idle time decreases. However, this step need not necessarily exclusively vary depending on the influent conditions. For example, any of the other batch flow mode steps may be varied proportionally according to operating conditions or as determined by the operator.

During each of the continuous flow mode steps, controller 82 monitors the influent flow rate as measured by input apparatus 84 and generally sequences the valves and motors of the wastewater treatment system according to the corresponding treatment step. Specifically, as with the batch flow mode, controller 82 generates output signals during each step of the continuous flow mode to actuate, throttle or close any of the valves, pump and air source to regulate fluid through the wastewater treatment system. In the continuous flow mode, the wastewater treatment system may include at least one of a filling while aerating (aerated fill), mixing, settling (filled settle) and decanting (filled decant). In particular, during fill or during anoxic fill, which may continue during the filled settle and filled decant steps, influent flows through piping manifold 36 and out through apertures 40 of conduit 30. In another embodiment, controller 82 actuates valves (not shown) regulating flow through each arm of conduit 30 to prevent short-circuiting of bypassing, where no or minimal digestion of influent occurs because it flows almost directly into the decanting system.

The aerated fill step allows biodigestion. Aeration during filling may continue from anoxic filling until the liquid level reaches the maximum level; at that point, settle may begin. In this step, controller 82 typically continues to monitor the level of liquid 42, through level indicator 84, while controlling and sending output signals. Additionally, controller 82 may send output signals to air source 22 or an air valve (not shown) in conduit 20 to throttle or regulate airflow through distribution structure 24. Controller 82 may also send output signals to close at least one of valves 48, 50, 52, 54, 56, and to de-energize the motor of pump 14.

The filled settle step typically follows the aerated fill step. The filled settle step permits settling of the biomass solids before the filled decant step and is substantially similar to the settling step of the batch flow mode. In particularly, controller 82 sends output signals to close all valves except for influent valve 32 which may be throttled to reduce the influent flow rate so as to minimize turbulence and disturbance of the settling process.

The filled decant step may involve withdrawal of the upper portion of the liquid through the decanting system. This step is also similar to the corresponding batch flow mode decanting step. Thus, controller 82 may generate corresponding output signals to open or close the corresponding valves to allow removal of the substantially clear liquid above liquid 42. In other embodiments, the continuous flow mode further includes a sludge removal step during filling. This step, typically but not necessarily, follows the filled settle step. This step is also similar to the corresponding batch flow mode sludge removal step and thus, controller 82 would generate corresponding output signals to actuate the corresponding valves to allow sludge removal to sludge treatment 64.

The invention may be further understood with reference to the following example. The example is intended to serve as an illustration and not as a limitation of the present invention as defined in the claims herein.

EXAMPLE

A wastewater treatment system embodying features of the invention was designed. The designed wastewater treatment system included four SBRs designed based on the influent wastewater stream characteristics summarized in Table 1. In particular, the wastewater treatment system operated predominantly as a SBR and, as necessary, as a CFBRT. A programmed process controller, described below, controlled the wastewater treatment system and incorporated treatment steps or periods in each cycle. Each reactor in the wastewater treatment system was designed to aerate with 1,680 lbs. of oxygen per hour. The flow transition set-point was designed to be a process set-point, typically set at the nominal flow rate or determined and set by the wastewater treatment system operator. In this example, the set-point or nominal flow rate was set at 30 million gallons per day (MGD).

For flow rates below the flow transition set-point, the reactors were sequenced in the batch flow mode with at least an anoxic fill step, an aerated fill step, a react step, a quiescent settle step and a decant step.

The process control system automatically supervised operation of all reactors in any of various modes including at least the batch flow, continuous flow, maintenance, equipment failure or operator discretion. The control system transitioned between any of the various modes automatically. The control system also monitored and detected failed units including, for example, the pumping system, the decanting system and the valves. When the control system detected a failed unit, it isolated and placed the affected reactor out of service. In conjunction, the control system indicated an alarm or warning and recorded the failure event.

The control system was designed to include a control panel capable of controlling, depicting and providing input of control parameters for the wastewater treatment system and its subsystems including the aeration system, decanting system, fill system, sludge removal system, and the pumping system. In particular, the control system used a programmable controller with a program, specifically a PLC using ladder logic, with CMOS RAM and EPROM memory. Also, the control system was designed to have at least one real time clock, operator interface port, local I/O expansion port, remote I/O port and peer CPU I/O port as well as other communications ports, such as RS232 and RS422.

The control system was designed to have an operator interface capable of displaying set-points and process conditions and variables. Specifically, a PC based operator interface having graphics capability was provided. The PC interface used input and output devices such as a keypad and display monitor along with software to graphical display the system control loops, set-points and other various process variables so that the operator could actively operate the wastewater treatment system through the control system.

The software controlling the wastewater treatment system employed flow and time adoptive algorithms to make automatic cycle as well as cycle step adjustments. At a minimum, the software was designed to receive input signals, from level indicators or flow meters, and to calculate a flow rate as well as to determine whether to switch into the batch or continuous flow modes. Notably, the control system was also designed to change the mode of operation of the wastewater treatment system, or a reactor in the wastewater treatment system, to the batch flow mode if the influent rate fell below the flow transition set-point.

During the fill step, which was typically anoxic, the aeration system, the decant system and the sludge removal system remained idle. However, at the latter moments of the fill step, the control system typically started the aeration system. At the design flow, at least of 30% of the total fill step time was designed to be anoxic. So, the control system monitored the influent rate and adjusted the anoxic fill step accordingly.

During the aeration step, the aeration system provided air to promote biomass activity and digestion of the biodegradable matter in the influent. For each treatment cycle, the aeration period was designed to last at least 17.5% of the cycle time at the minimum flow rate, at least 50.0% of the cycle time at the design flow rate, and was accordingly proportional when the influent flow rate fell between the minimum and design.

Quiescent settle was designed to follow aeration. The settle period was designed to last a minimum of 45 minutes. The control system automatically determined the minimum settle time and sequenced the cycle accordingly.

During the decant step, the decanting system withdrew treated effluent from the liquid upper portion. In this step, the control system operated the decanting system so that the substantially clear layer of liquid above the treated liquid could be removed.

For flow rates above the flow transition set-point, the wastewater treatment system was designed to operate in a continuous flow mode with accordingly discrete treatment steps. In typical operation, the control system monitored the influent rate and compared this calculated rate against the nominal flow rate of 30 MGD. At influent rates above the flow transition set-point, the controller controlled the wastewater treatment system in the continuous flow mode with at least one of an anoxic fill, an aerated fill, a filled settle, and a filled decant step.

During anoxic fill, influent was distributed into the reactor so that there was minimal disruption of settled solids. During aerated fill, the aeration system was operated to promote biomass activity and biodegradation. During filled settle, the biomass was allowed to settle. Notably, just as in anoxic fill, the influent was also distributed into the reactor so that there was minimal disruption of the settling or sedimentation process. This period was designed to last at least 45 minutes at all influent rates. During the filled decant step, the decanting system withdrew the substantially clear layer from the upper portion of the liquid. As with the batch flow mode, each of the continuous flow mode steps were monitored, sequenced and controlled by the control system so that the proper valve, pump and air source were actuated and operated as necessary.

TABLE 1

Municipal Wastewater Treatment System Design Criteria

| | |
|---|---|
| Average Flow | 11 MGD |
| Peak Flow | 44 MGD |
| Peak Instantaneous Flow | 60 MGD |
| Influent BOD | 234 mg/l |
| Influent Suspended Solids | 234 mg/l |
| Effluent Suspended Solids | 30 mg/l |
| Influent Phosphorus | 6.0 mg/l |
| Wastewater Temperature | 12–23° C. |

Further modifications and equivalents of the invention herein disclosed will occur to persons skilled in the art using no more than routine experimentation and all such modifications and equivalents are believed to be within the spirit and scope of the invention as defined by the following claims.

What is claimed is:

1. A wastewater treatment system having a flow control comprising:
   an influent system having an influent flow;
   a wastewater treatment apparatus fluidly connected to the influent system, the wastewater treatment apparatus having a pump and a valve; and
   a regulating apparatus controlling one of the pump and the valve and comprising a controller and an input apparatus for providing an input signal representing the influent flow,
      wherein the controller analyzes the input signal and generates an output signal configured to at least one of a batch flow mode and a continuous flow mode.

2. The wastewater treatment system of claim 1, wherein the influent system comprises at least one baffle wall.

3. The wastewater treatment system of claim 1, wherein the output signal causes at least one of the valve to throttle a fluid flow and a pump to provide a desired pump flow.

4. The wastewater treatment system of claim 1, wherein the wastewater treatment apparatus further comprises a filling system.

5. The wastewater treatment system of claim 4, wherein the filling system comprises a distribution conduit fluidly connected to the influent system.

6. The wastewater treatment system of claim 5, wherein the valve comprises an influent valve regulating the influent flow.

7. The wastewater treatment system of claim 1, wherein the wastewater treatment apparatus further comprises an aeration system.

8. The wastewater treatment system of claim 7, wherein the wastewater treatment apparatus further comprises a mixing system.

9. The wastewater treatment system of claim 7, wherein the aeration system comprises at least one distribution structure.

10. The wastewater treatment system of claim 9, wherein the valve comprises an aeration valve throttling the fluid flow to the distribution structure.

11. The wastewater treatment system of claim 1, wherein the wastewater treatment apparatus further comprises an effluent system.

12. The wastewater treatment system of claim 11, wherein the effluent system further comprises of a decanting system.

13. The wastewater treatment system of claim 11, wherein the effluent system further comprises of an effluent outlet.

14. The wastewater treatment system of claim 13, wherein the valve comprises an effluent valve throttling the fluid flow to the effluent outlet.

15. The wastewater treatment system of claim 1, wherein the wastewater treatment apparatus further comprises a sludge removal system.

16. The wastewater treatment system of claim 15, wherein the sludge removal system further comprises a distribution conduit.

17. The wastewater treatment system of claim 16, wherein the sludge removal system further comprises a sludge outlet.

18. The wastewater treatment system of claim 15, wherein the valve comprises a sludge valve throttling the fluid flow to the sludge outlet.

19. The wastewater treatment system of claim 1, wherein the wastewater treatment apparatus further comprises a decanting system.

20. The wastewater treatment system of claim 19, wherein the decanting system further comprises a receiver apparatus.

21. The wastewater treatment system of claim 20, wherein the decanting system further comprises a discharge conduit.

22. The wastewater treatment system of claim 21, wherein the valve comprises a decant valve.

23. The wastewater treatment system of claim 1, wherein the input apparatus is selected from the group comprising of a flowmeter, a pressure sensor and a level sensor.

24. The wastewater treatment system of claim 1, wherein the controller comprises one of a programmable logic controller, a PC, a timer/switch system and a distributed control system.

25. The wastewater treatment system of claim 1, wherein the wastewater treatment system comprises at least two reactors.

26. A control system for regulating a wastewater treatment system comprising:
   an input apparatus connected to the wastewater treatment system for transmitting an input signal corresponding to an influent flow;
   a microprocessor for receiving and analyzing the input signal according to a logic program code and generating an output signal corresponding to one of a batch flow mode and a continuous flow mode; and
   an output apparatus for receiving the output signal and actuating a valve to regulate a flow in the wastewater system in one of the batch and the continuous flow modes.

27. The control system of claim 26, wherein the input apparatus is selected from the group comprising of a flowmeter, an on/off-indication level sensor, a pressure sensor and a level indicator.

28. The control system of claim 27, further comprising a pumping system fluidly connected to the wastewater treatment system.

29. The control system of claim 28, wherein the pumping system comprises a pump with a pump motor.

30. The control system of claim 29, wherein the output apparatus comprises a motor control center energizing the motor.

31. The control system of claim 30, further comprising a filling system.

32. The control system of claim 31, wherein the filling system comprises at least one baffle wall.

33. The control system of claim 31, wherein the filling system comprises a distribution conduit fluidly.

34. The control system of claim 33, wherein the output apparatus further comprises an influent valve regulating the influent flow.

35. The control system of claim 34, further comprising an aeration system.

36. The control system of claim 35, wherein the aeration system comprises a distribution structure.

37. The control system of claim 36, wherein the output apparatus further comprises an aeration valve regulating an air flow to the distribution structure.

38. The control system of claim 37, further comprising an effluent system.

39. The control system of claim 38, wherein the effluent system further comprises a decanting system.

40. The control system of claim 39, wherein the effluent system further comprises an effluent outlet.

41. The control system of claim 40, wherein the outlet apparatus further comprises an effluent valve regulating an effluent flow to the effluent outlet.

42. The control system of claim 41, further comprising a sludge removal system fluidly connected to the distribution conduit.

43. The control system of claim 42, wherein the sludge removal system further comprises a sludge outlet.

44. The control system of claim 43, wherein the output apparatus further comprises a sludge valve regulating a sludge flow to the sludge outlet.

45. The control system of claim 44, wherein the microprocessor comprises at least one of a PC, a timer/switch system, a programmable logic controller and a distributed control system.

46. A method for treating a wastewater stream comprising:
    introducing the wastewater stream into a wastewater treatment system;
    measuring a rate of wastewater stream flow; and
    controlling the wastewater treatment system in one of a batch flow mode and a continuous flow mode according to the measured rate.

47. The method of claim 46, wherein the step of controlling the wastewater treatment system in the batch flow mode comprises aerating the wastewater.

48. The method of claim 46, wherein the step of controlling the wastewater treatment system in the batch flow mode comprises settling entrained solids.

49. The method of claim 46, wherein the step of controlling the wastewater treatment system in the batch flow mode comprises decanting a substantially clear layer.

50. The method of claim 46, wherein the step of controlling the wastewater treatment system in the batch flow mode comprises removing an amount of sludge.

51. The method of claim 46, wherein the step of controlling the wastewater treatment system in the continuous flow mode comprises aerating while introducing the wastewater stream.

52. The method of claim 46, wherein the step of controlling the wastewater treatment system in the continuous flow mode comprises settling entrained solids while introducing the wastewater stream.

53. The method of claim 46, wherein the step of controlling the wastewater treatment system in the continuous flow mode comprises decanting while introducing the wastewater stream.

54. The method of claim 46, wherein the step of controlling the wastewater treatment system in the continuous flow mode comprises removing an amount of sludge while introducing the wastewater stream.

55. A method for controlling a wastewater treatment system comprising:
    introducing a wastewater stream into the wastewater treatment system;
    transmitting a process signal corresponding to an operating condition in the wastewater treatment system;
    analyzing the process signal;
    providing an output signal corresponding to one of a batch flow mode and a continuous flow mode according to a set of predetermined conditions; and
    actuating a valve based on the output signal.

56. The method of claim 55, wherein the step of analyzing the process signal comprises determining an influent flow rate of the wastewater stream.

57. The method of claim 55, wherein the batch flow mode further comprises the step of aerating the wastewater.

58. The method of claim 57, wherein the batch flow mode further comprises the step of settling entrained solids.

59. The method of claim 58, wherein the batch flow mode further comprises the step of decanting a substantially clear layer.

60. The method of claim 59, wherein the batch flow mode further comprises removing an amount of sludge.

61. The method of claim 55, wherein the continuous flow mode further comprises the step of aerating while introducing the wastewater stream.

62. The method of claim 61, wherein the continuous flow mode further comprises the step of allowing entrained solids to settle while introducing the wastewater stream.

63. The method of claim 62, wherein the step of controlling the wastewater treatment system in the continuous flow mode further comprises decanting while introducing the wastewater stream.

64. A method for controlling a wastewater treatment system comprising:
    transmitting a process signal from the wastewater treatment system corresponding to one of a first influent flow rate and a second influent flow rate; and
    sequencing the periods of treatment of the wastewater treatment system in a batch flow mode during the first influent flow rate and sequencing the periods of treatment of the wastewater treatment system in a continuous flow mode during the second influent flow rate, wherein the second influent flow rate is greater than the first influent flow rate.

65. The method of claim 64, wherein the step of sequencing the periods of treatment in the batch flow mode comprises at least one of filling, aerating, mixing, settling, removing sludge and decanting wastewater.

* * * * *